(12) United States Patent
Zhu et al.

(10) Patent No.: US 10,164,684 B2
(45) Date of Patent: Dec. 25, 2018

(54) INTERFERENCE DETECTION AND MITIGATION IN POWER LINE COMMUNICATION

(71) Applicant: Hong Kong Applied Science and Technology Research Institute Company, Limited, Hong Kong (HK)

(72) Inventors: Zhixia Zhu, Hong Kong (HK); Kwok Kwan Tong, Hong Kong (HK); Wei Lun Alan Cheung, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 288 days.

(21) Appl. No.: 15/261,103

(22) Filed: Sep. 9, 2016

(65) Prior Publication Data
US 2018/0076850 A1 Mar. 15, 2018

(51) Int. Cl.
*H04B 3/30* (2006.01)
*H04B 3/54* (2006.01)
(Continued)

(52) U.S. Cl.
CPC .............. *H04B 3/30* (2013.01); *H04B 3/544* (2013.01); *H04L 1/004* (2013.01); *H04L 43/028* (2013.01); *H04L 47/29* (2013.01)

(58) Field of Classification Search
CPC .......... H04B 1/10; H04B 1/71; H04B 1/1036; H04B 1/7102; H04B 1/7103; H04B 3/30;
(Continued)

(56) References Cited

U.S. PATENT DOCUMENTS 4,479,215 A 10/1984 Baker
5,553,081 A * 9/1996 Downey et al.
(Continued)

FOREIGN PATENT DOCUMENTS

CN 102111242 8/2013
CN 102111242 B 8/2013
(Continued)

OTHER PUBLICATIONS

ISR and Written Opinion, PCT/CN2016/098909, dated May 31, 2017.

*Primary Examiner* — Marsha D Banks Harold
*Assistant Examiner* — Dharmesh J Patel
(74) *Attorney, Agent, or Firm* — Stuart T. Auvinen; gPatent LLC (57) ABSTRACT

A Power-Line Communication (PLC) receiver has a filter, a time domain processor, a frequency-domain processor, and a forward-error-correction decoder. A narrow-band frequency detector attached to the frequency-domain processor examines the frequency-domain signal for a highest-power sub-carrier frequency. This highest power is compared to an average power of all other sub-carriers and a narrow-band interferer is detected when the highest power is significantly above the average. When the interferer is detected N times in a time period, a control layer adds this sub-carrier frequency to a removed list and recalculates filter coefficients to add a notch filter at the frequencies of the removed list. Updated filter coefficients are loaded into the filter to implement notch filters. When the current power of a sub-carrier signal on the removed list falls significantly below the average power, the sub-carrier is deleted from the removed list and coefficients recalculated to remove the notch filter.

19 Claims, 11 Drawing Sheets

(51) Int. Cl.
  *H04L 1/00* (2006.01)
  *H04L 12/26* (2006.01)
  *H04L 12/801* (2013.01)

(58) Field of Classification Search
  CPC .......... H04B 3/54; H04B 3/544; H04B 15/00; H04B 2201/709709; H04B 2201/709718; H04L 1/004; H04L 25/085; H04L 43/028; H04L 47/29; H04R 1/1083; G10K 11/16; G10K 11/178; G10K 2210/3028; H04K 3/228
  See application file for complete search history.

(56) References Cited

U.S. PATENT DOCUMENTS

| | | | |
|---|---|---|---|
| 6,426,983 B1 * | 7/2002 | Rakib et al. | |
| 6,976,044 B1 | 12/2005 | Kilani | |
| 8,059,768 B2 | 11/2011 | Zhao et al. | |
| 8,848,836 B2 | 9/2014 | Umari et al. | |
| 9,106,300 B1 | 8/2015 | Meng et al. | |
| 2003/0194030 A1 | 10/2003 | Modlin | |
| 2008/0025445 A1 | 1/2008 | Einbinder | |
| 2009/0304133 A1 | 12/2009 | Umari et al. | |
| 2012/0093240 A1 | 4/2012 | McFarland et al. | |
| 2013/0101055 A1 | 4/2013 | Pande et al. | |
| 2014/0269849 A1 * | 9/2014 | Abdelmonem et al. | |

FOREIGN PATENT DOCUMENTS

| | | |
|---|---|---|
| CN | 104144138 | 11/2014 |
| CN | 104144138 A | 11/2014 |
| CN | 105191159 | 12/2015 |
| CN | 105191159 A | 12/2015 |
| CN | 205249269 | 5/2016 |
| CN | 105635021 | 6/2016 |
| CN | 105827561 | 8/2016 |

* cited by examiner

PRIOR ART

INTERFERENCE DETECTION AND MITIGATION IN POWER LINE COMMUNICATION

FIELD OF THE INVENTION

This invention relates Power-Line Communication (PLC) systems, and more particularly to filtering noise from PLC systems.

BACKGROUND OF THE INVENTION

Power-Line Communication (PLC) systems are useful for some specialized smart-grid applications such as to send meter readings back to a central office, or to send commands to control electrical distribution and loading. Home automation and networking can also use PLC with adapters inserted into ordinary A.C. power receptacles. PLC networking such as the HomePlug AV standard does not disturb the A.C. power distribution.

While PLC has been used for some time, low data rates (narrow-band) have been used. Half-duplex operations are used since transmission and reception cannot be done simultaneously. It is desired to carry higher data rates with PLC and to improve reliability.

Figure 1:
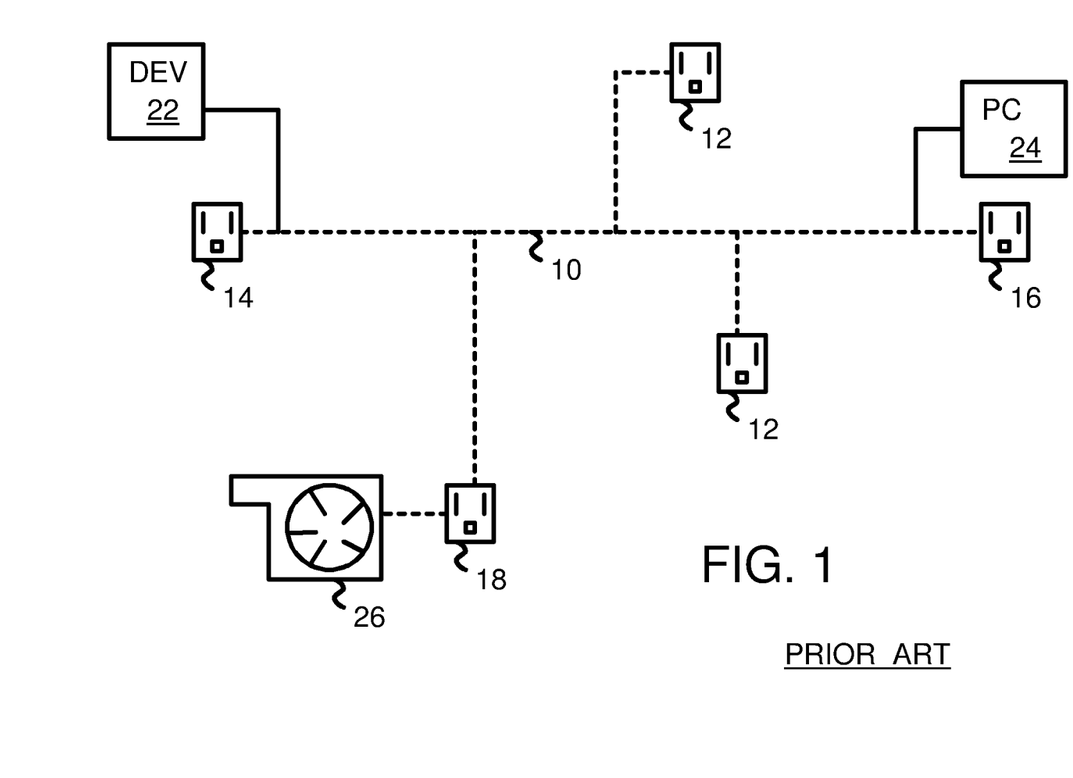
FIG. 1 shows a PLC system.

FIG. 1 shows a PLC system. Power line 10 carries alternating current (A.C.) such as 110 volts, 120 volts, 220 volts, or 240 volts, alternating at 60 cycles per second, (60 Hz) or alternating at 50 Hz. Appliances, lamps, and other devices requiring electricity can be plugged into receptacles 12, 14, 16, 18. Communication signals between device 22 and personal computer (PC) 24 may be carried over power line 10 by special adapters plugged into receptacles 14, 16. However, when large load appliance 26 is switched on, it suddenly draws a large current from its receptacle 18. This large load can cause noise on power line 10 that can interfere with communications between device 22 and PC 24.

Figure 2:
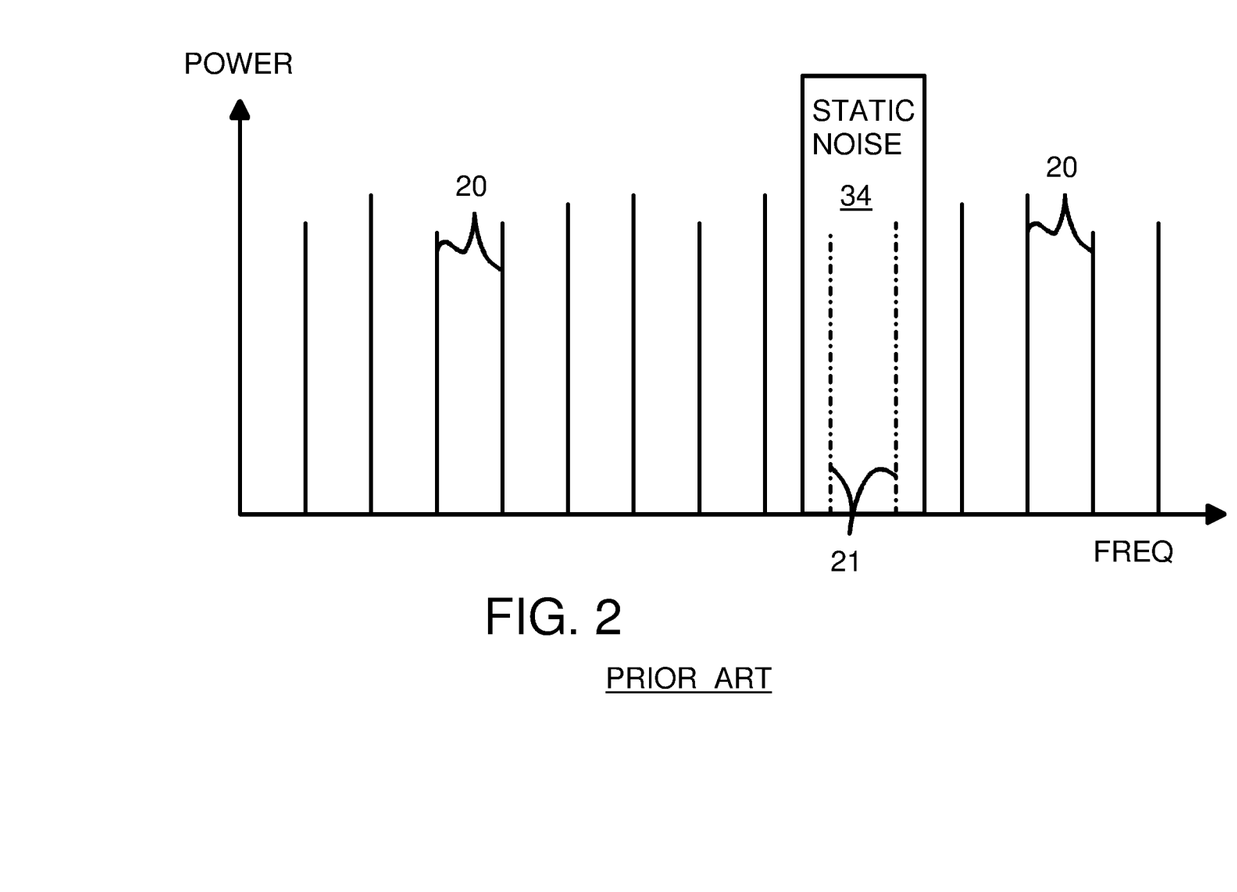
FIG. 2 shows noise that disrupts some sub-carrier frequencies during Power-Line Communication (PLC).

FIG. 2 shows noise that disrupts some sub-carrier frequencies during Power-Line Communication (PLC). Sub-carriers 20 are frequencies that a PLC transmits over. The same data may be simultaneously transmitted over several sub-carriers 20 to provide redundancy and mitigate the noisy A.C. power-line environment. Static noise 34 on the power line interferes with the signal being carried by sub-carriers 21, but not with other sub-carriers 20. Data can still be carried by other sub-carriers 20.

Figure 3:
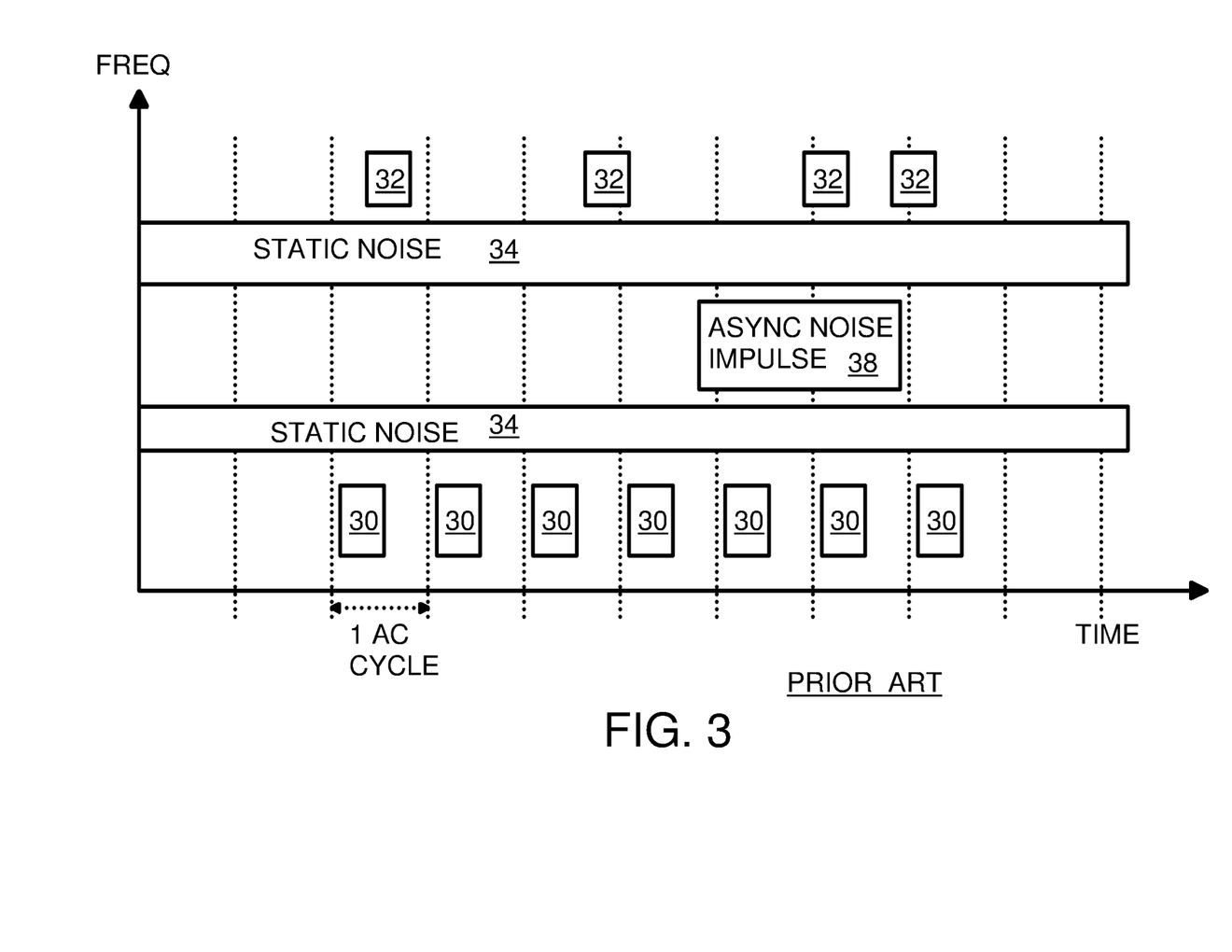
FIG. 3 illustrates a variety of noise types in PLC.

FIG. 3 illustrates a variety of noise types in PLC. Static noise 34 occurs at specific frequencies for long periods of time. Periodic noise 30 are impulses synchronized to the A.C. power cycle and may appear for long periods of time and then disappear for long periods of time, such as when a noisy appliance is turned on and then off. Aperiodic impulsive noise 32 is not synchronous with the A.C. power cycle but repeatedly appears. Asynchronous noise impulse 38 appears once and then disappears. Background noise may also exist across all frequencies.

The power line environment is inherently noisy with a variety of noise generators and sources. Noise may appear periodically or seemingly at random, and at any frequency. A different snapshot in time would show a different arrangement of noise and frequency than shown in FIG. 3.

It is desired to extend narrow-band PLC to a broad-band PLC with higher data rates. It is desired to detect and filter out noise on the power lines to allow data to be transmitted over low-noise frequencies. It is desired to dynamically detect noise and continuously adjust filtering to avoid noisy frequencies. It is desired to resume using frequencies that had noise that has now diminished to provide as many frequencies for data transmission as possible.

DETAILED DESCRIPTION

The present invention relates to an improvement in Power-Line Communication (PLC) noise filtering. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 4:
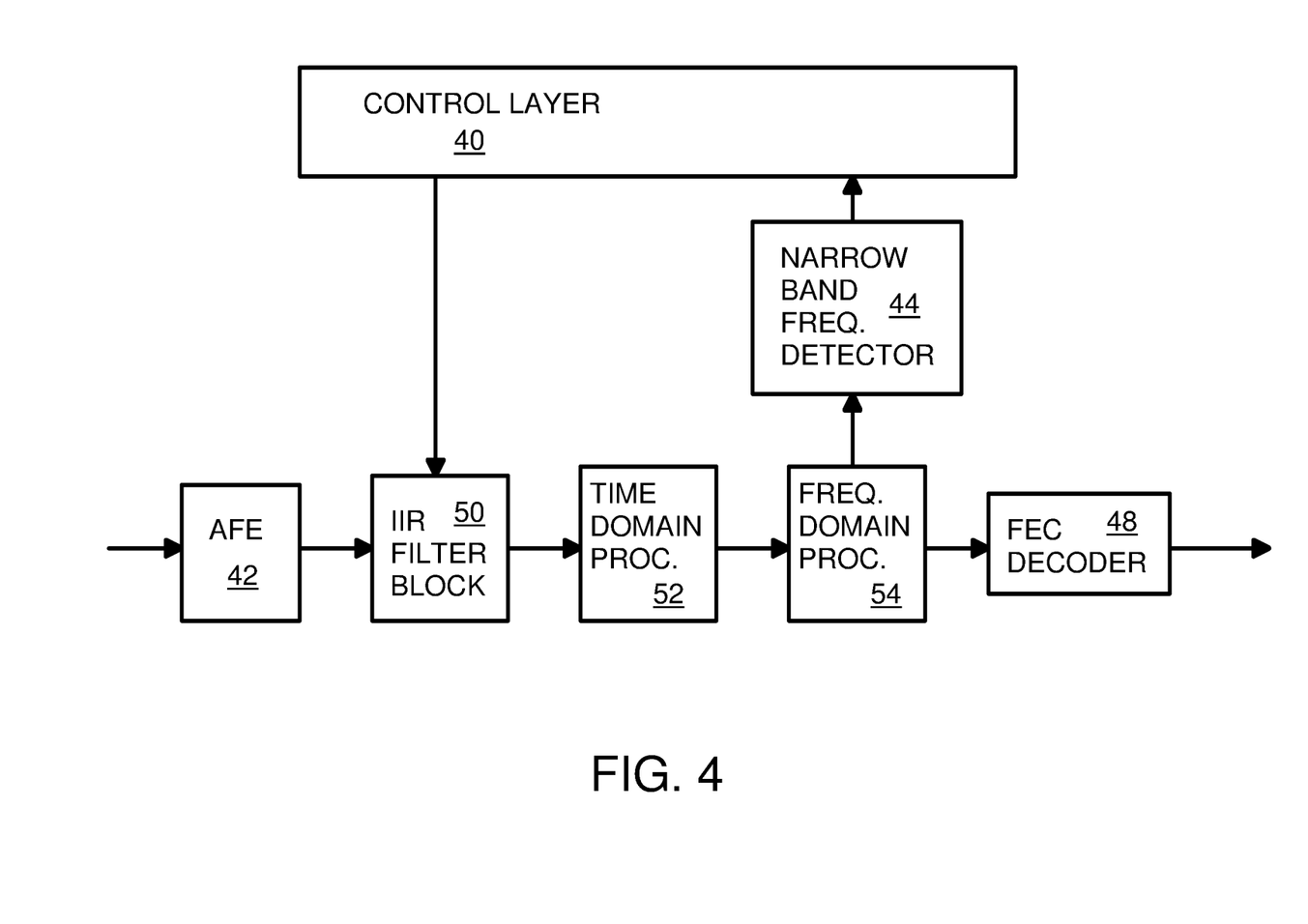
FIG. 4 is a block diagram of a Power-Line Communication (PLC) receiver that continuously detects and filters power-line noise.

FIG. 4 is a block diagram of a Power-Line Communication (PLC) receiver that continuously detects and filters power-line noise. Analog Front-End (AFE) 42 has analog filters, amplifiers, and an Analog-to-Digital Converter (ADC). AFE 42 receives a signal from a power line, such as through an isolation transformer or a router or a smart household/office appliance. The analog signal is converted to a digital signal by an ADC and applied to filter 50. Filter 50 is an Infinite Impulse Response (IIR) filter that attenuates various frequencies identified by control layer 40. For example, filter 50 can simultaneously implement several filters, such as a high-pass filter to filter out low frequency noise near and below 60 Hz, and notch filters to attenuate various frequencies above 60 Hz where noise has been detected.

Time domain processor 52 receives the filtered signal from IIR filter 50 and performs various digital-signal processor (DSP) operations on the time-domain signal. The processed time-domain signal is converted to a frequency-domain signal, such as by a Fast-Fourier Transform (FFT) operation. Time-domain to frequency-domain signal conversion may be viewed as a connector between time domain processor 52 and frequency-domain processor 54, while an ADC may be viewed as the connector between AFE 42 and filter 50. The frequency-domain signal is operated upon using digital-signal processor (DSP) operations by frequency-domain processor 54. Time domain operations are based on time domain signals, and can include sample frequency compensation, frame synchronization, digital Automatic Gain Control (AGC) as a few examples. Frequency-domain processor 54 performs operations based on frequency domain signals, such as channel estimation, equalization, de-mapping, etc.

The frequency-domain output from frequency-domain processor 54 is applied to forward-error-correction (FEC) decoder 48, which decodes the signal and generates symbols and ultimately data that was received over the power line. FEC decoder 48 performs a reversion operation of the FEC encoder operation performed by the transmitter, and may include a diversity combiner, a channel de-interleaver, a turbo decoder, or a de-scrambler. Ultimately the data transmitted over the power line is recovered.

Data spread out over the frequency band and transmitted over several different frequencies is recovered to generate a single data stream. Data may be redundantly transmitted over many different frequencies or in different timeslots. Redundant data may be compared to detect and correct errors and any redundancies and appended error-correction codewords removed. The decoded data is then passed to other devices, systems, or subsystems for further handling, processing, and action.

The frequency-domain signal being operated upon by frequency-domain processor 54 is examined by narrow-band frequency detector 44. One or more frequencies with the highest average power are identified by narrow-band frequency detector 44, and an identifier or a list of these detected frequencies sent to control layer 40.

Control layer 40 maintains a list of detected frequencies over periods of time. Control layer 40 may also have a list of transmission frequencies, or frequencies that data is expected to be transmitted over, such as frequencies identified by a PLC standard such as HomePlug AV, or by the manufacturer of PLC adapters or transmitters.

Control layer 40 generates a new set of coefficients for IIR filter 50 using the detected (noisy) frequencies. These new coefficients implement a notch filter that attenuates the signal near the detected frequency. Thus the noisy frequency is attenuated by IIR filter 50 to remove the noisy detected by narrow-band frequency detector 44. Multiple notch filters such as a comb filter may be implemented by IIR filter 50 when multiple noisy frequencies are identified by narrow-band frequency detector 44.

When power for a frequency is significantly above the average power for most other transmission frequencies, the higher power is likely caused by a noise source, since power-line noise is often much greater than the PLC transmission signals. The inventors assume that power that is significantly above average is caused by a noise source. Frequencies at or near this high-power noise are filtered to remove the noise. Any data transmitted over these noisy frequencies are filtered out and attenuated, allowing data transmitted over other non-noisy frequencies to be used to recover the transmitted datastream.

Figure 5:
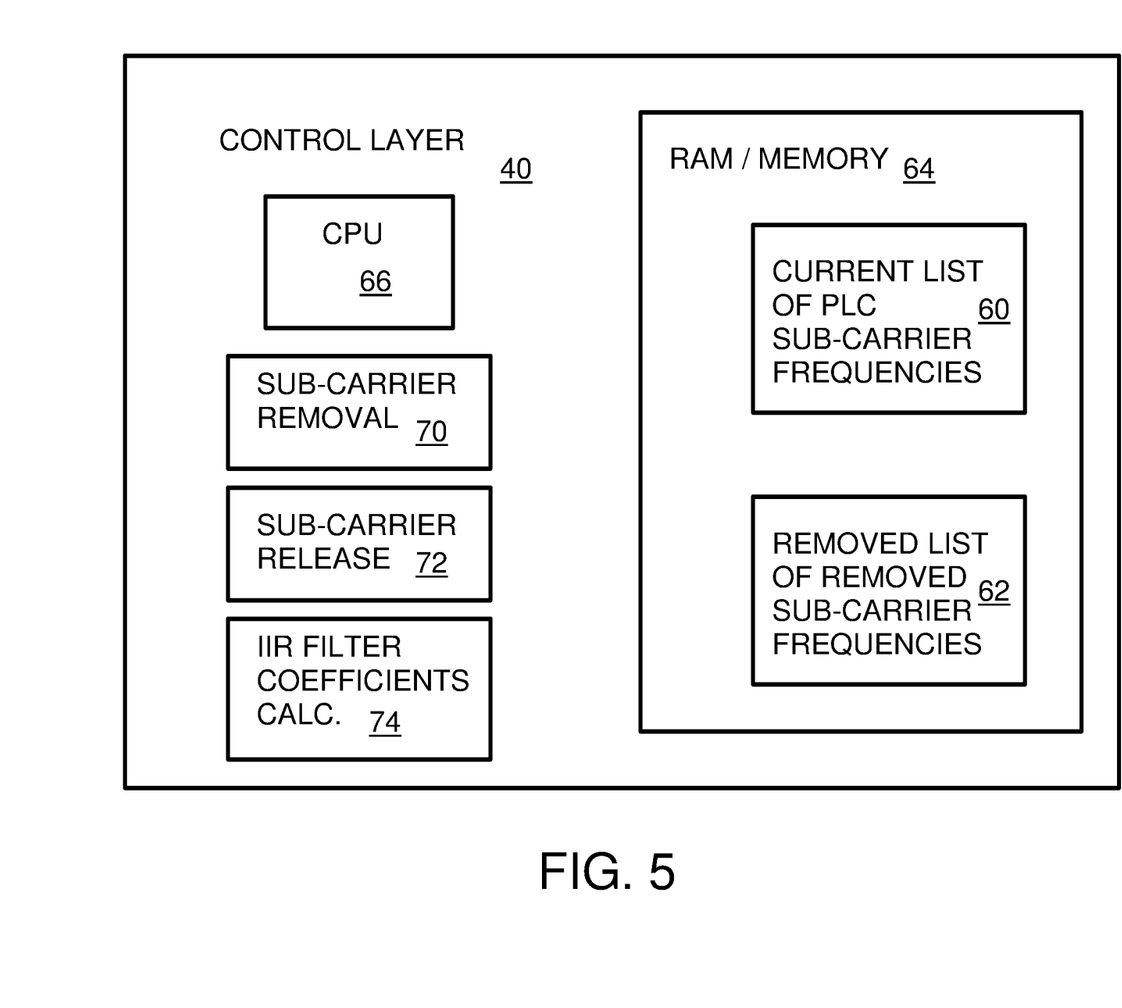
FIG. 5 shows the control layer in more detail.

FIG. 5 shows control layer 40 in more detail. Control layer 40 has central processing unit (CPU) 66 that executes instructions in routines and procedures stored in memory, such as in memory 64, or in a ROM, flash memory, or hardwired, or various combinations thereof. Higher-level operations performed include sub-carrier removal routine 70, sub-carrier release routine 72, and IIR filter coefficients calculator 74.

Memory 64 stores current list 60, and removed list 62. Removed list 62 is a list of one or more sub-carrier frequencies that were identified by narrow-band frequency detector 44 as having significantly above-average power. Removed list 62 may include only sub-carrier frequencies that a PLC transmitter might transmit over, or any frequency, such as frequencies between adjacent sub-carrier frequencies. Processing is simplified by including only sub-carrier frequencies in removed list 62, but some embodiments may allow for intermediate frequencies to also be detected and tracked.

Current list 60 is a list of all sub-carrier frequencies that a PLC transmitter may transmit over, without the removed frequencies in removed list 62. Thus the sub-carrier frequencies in current list 60 included only sub-carriers that are not currently experiencing severe noise. Current list 60 is a list of good sub-carrier frequencies that can safely carry data at the present time.

Figure 6:
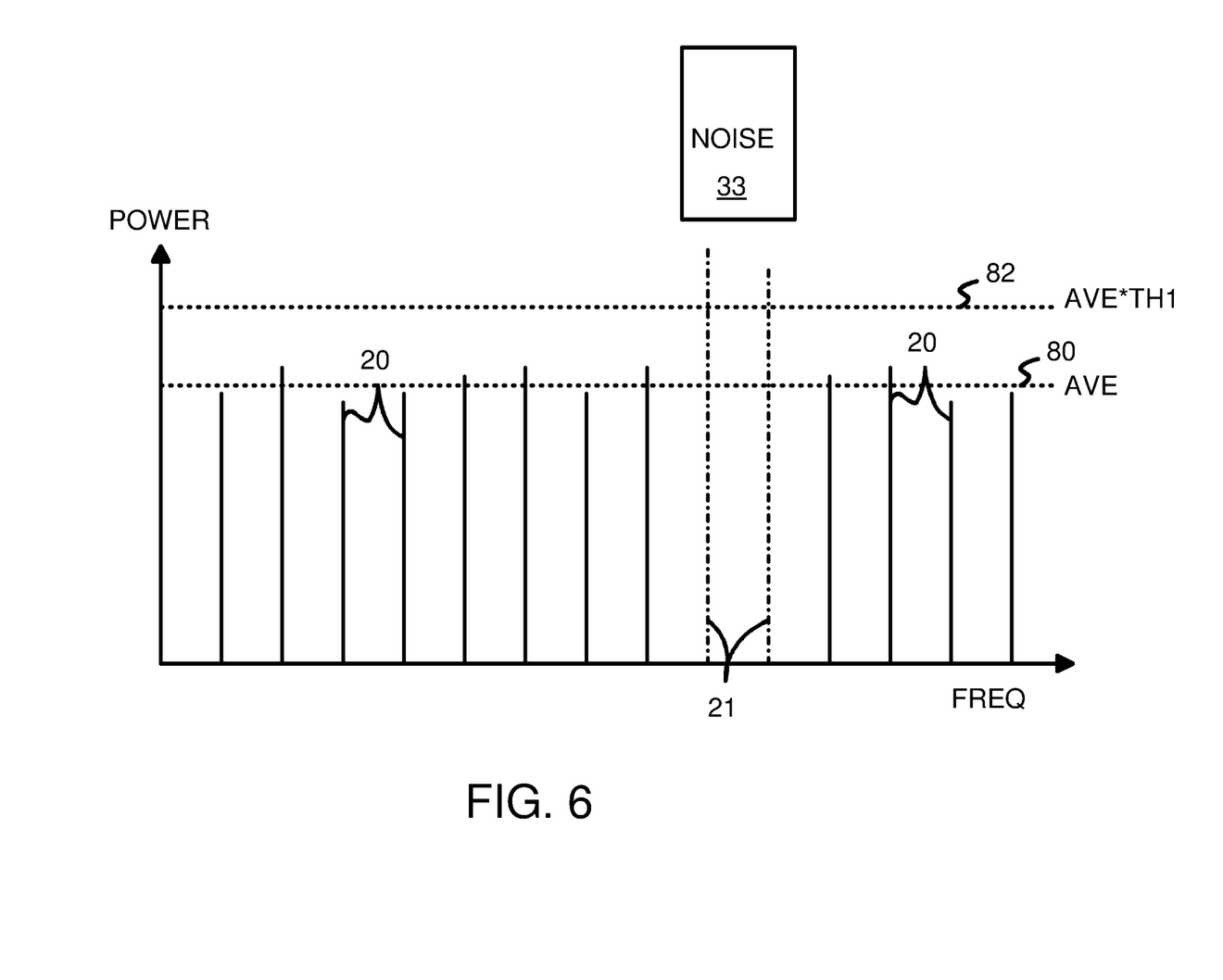
FIG. 6 highlights noise detection and removal.

FIG. 6 highlights noise detection and removal. Many sub-carriers 20 can carry data using PLC. These sub-carriers 20 may have various frequencies that are spaced apart at regular intervals defined by a PLC standard. The interval between adjacent sub-carriers 20 may be chosen to minimize interference. The spacing may be linear or logarithmic.

Most sub-carriers 20 have a signal strength or power that is near or below average power 80. Some sub-carriers 20 that are not being used by transmitters may have a very low or near-zero signal, but are not shown in FIG. 6.

FIG. 6 shows that two frequencies have significantly above-average power. Noise source 33 creates high-power noise around the frequencies of noisy sub-carriers 21.

Noisy sub-carriers 21 have power that is significantly above average power 80. Threshold power 82 is average power 80 multiplied by threshold TH1 and is significantly above average power 80. The power of noisy sub-carriers 21 is above threshold power 82.

The value of threshold multiplier TH1 is chosen so that sub-carriers 20 that are near average power 80 are not detected by narrow-band frequency detector 44. Roughly half of sub-carriers 20 will have power levels above average power 80 and half below at any given time. Thus threshold power 82 is significantly above the dispersion of normal power levels of sub-carriers 20.

The frequencies of noisy sub-carriers 21 are added to removed list 62 in control layer 40, and new filter coefficients are generated and applied to IIR filter 50 so that IR filter 50 implements a new notch filter centered at these frequencies. Then IR filter 50 removes or attenuates noisy sub-carriers 21 so that the noise at noisy sub-carriers 21 does not add to or disturb the final data recovered.

Figure 7:
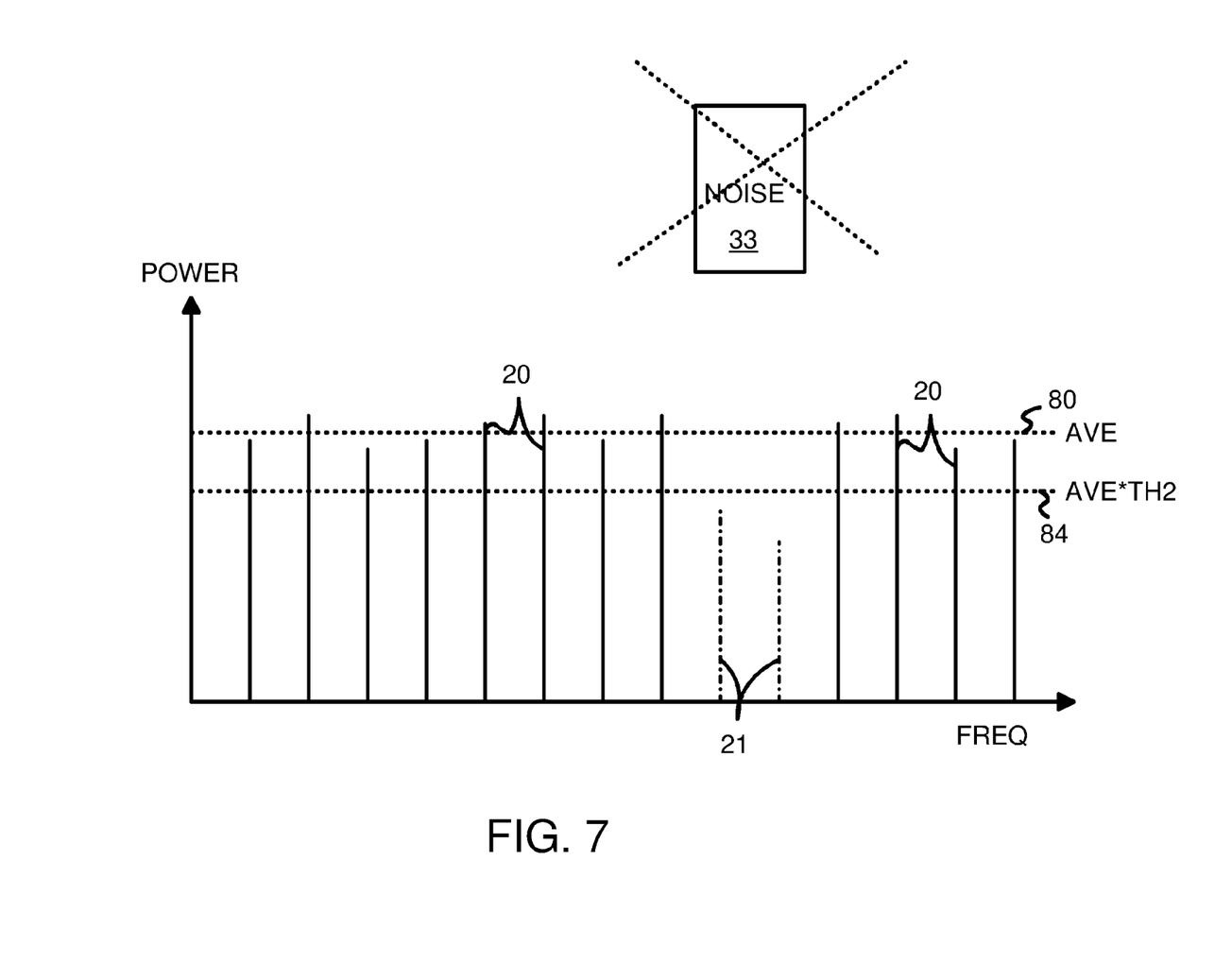
FIG. 7 highlights release of previously noisy sub-carriers.

FIG. 7 highlights release of previously noisy sub-carriers. After some time, noise source 33 may diminish or turn off. PLC data has been received using sub-carriers 20 that have power levels near average power 80.

Once noise source 33 is removed, the power level of noisy sub-carriers 21 drops significantly. The power of noisy sub-carriers 21 is being attenuated by the notch filters of IIR filter 50 so the power of noisy sub-carriers 21 seen by narrow-band frequency detector 44 should be below that of other sub-carriers 20 that do not have a notch filter. The power of noisy sub-carriers 21 should be well below average power 80 when noise source 33 is removed.

When the power of noisy sub-carriers 21 is below lower threshold power 84, these noisy sub-carriers 21 can be released. The frequencies of noisy sub-carriers 21 are deleted from removed list 62 and added back to current list 60 in control layer 40. Control layer 40 generates new filter coefficients that do not have the notch filter centered near noisy sub-carriers 21, and these new filter coefficients are sent to IIR filter 50 to remove the notch filter. Then the power levels of noisy sub-carriers 21 can return to near average power 80 and data carried over these formerly noisy sub-carriers 21 may again be recovered.

Lower threshold power 84 is average power 80 multiplied by threshold TH2 and is significantly below average power 80. The value of threshold multiplier TH2 is chosen so that sub-carriers 20 that are near average power 80 are not detected by narrow-band frequency detector 44. Lower threshold power 84 is chosen to be significantly below the dispersion of normal power levels of sub-carriers 20.

Note that the PLC transmitter continues to transmit data over noisy sub-carriers 21 even when noisy sub-carriers 21 are removed by IR filter 50. The PLC receiver of FIG. 4 operates independently of the PLC transmitter.

Figure 8:
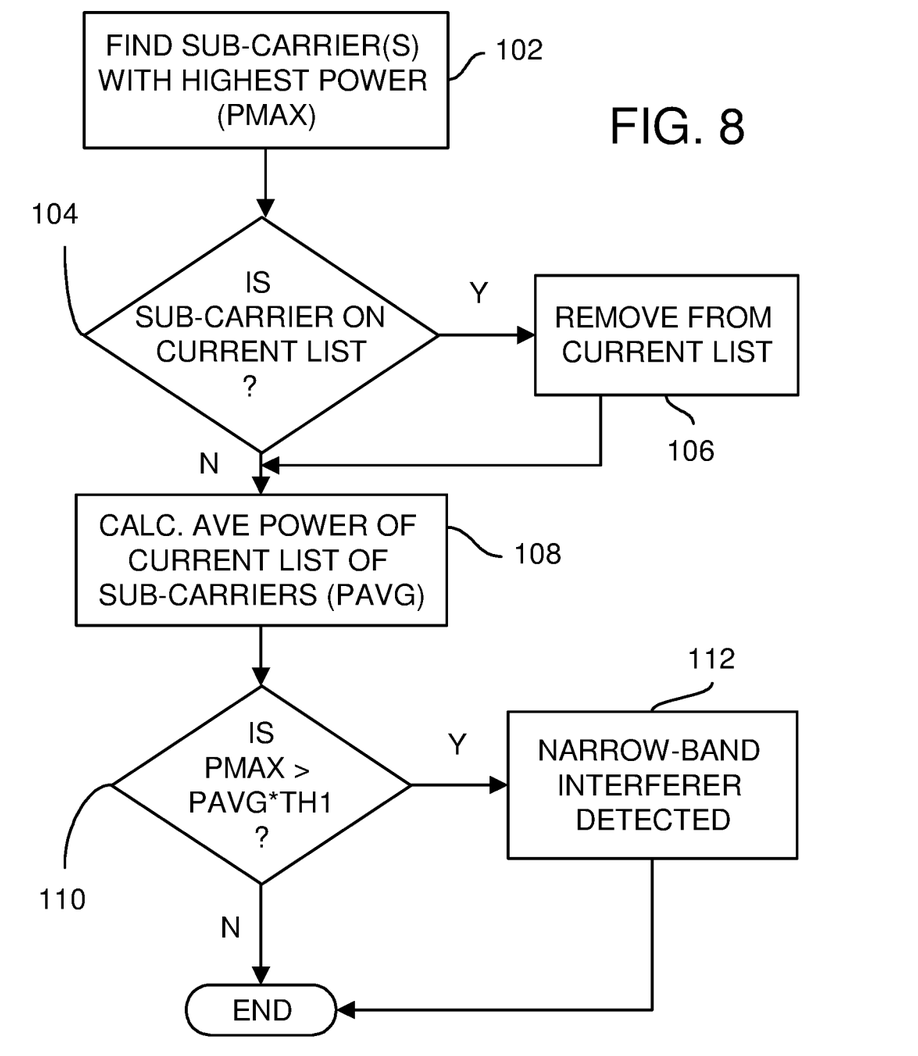
FIG. 8 is a flowchart of noisy sub-carrier detection by the narrow-band frequency detector.

FIG. 8 is a flowchart of noisy sub-carrier detection by narrow-band frequency detector 44. The sub-carrier with the highest power PMAX is detected by narrow-band frequency detector 44, step 102. If that sub-carrier is currently on current list 60, step 104, then that sub-carrier with high power PMAX is removed from current list 60, step 106.

The average power of the remaining sub-carriers on current list 60 is calculated, step 108. Removing the noisy sub-carrier with the highest power PMAX provides for a better average power PAVG for the other sub-carriers.

When PMAX is more than TH1 multiplied by average power PAVG, step 110, then the sub-carrier has power that is significantly above average. A narrow-band interferer has been detected, step 112.

When PMAX is not more than TH1 multiplied by average power PAVG, step 110, then the sub-carrier has power that is above average but not significantly above average. A narrow-band interferer has not been detected.

Figure 9:
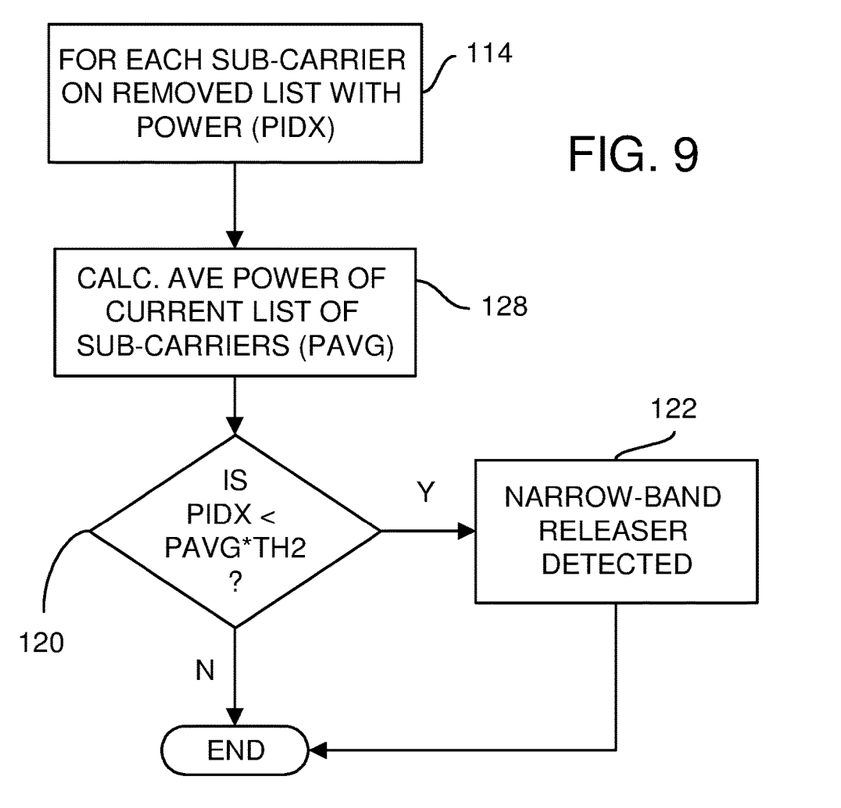
FIG. 9 is a flowchart of noisy sub-carrier release detection by the narrow-band frequency detector.

FIG. 9 is a flowchart of noisy sub-carrier release detection by narrow-band frequency detector 44. Each sub-carrier on removed list 62 is examined by narrow-band frequency detector 44 and its power PIDX determined, step 114.

The average power of the remaining sub-carriers on current list 60 is calculated, step 128. This average changes over time.

When PIDX is less than TH2 multiplied by average power PAVG, step 120, then the sub-carrier has power that is significantly below average. The noise source has subsided. A narrow-band releaser has been detected, step 122.

When PIDX is not less than TH2 multiplied by average power PAVG, step 120, then the sub-carrier has power that is not significantly below average. The noise source has not yet sufficiently subsided. A narrow-band releaser has not yet been detected.

Figure 10:
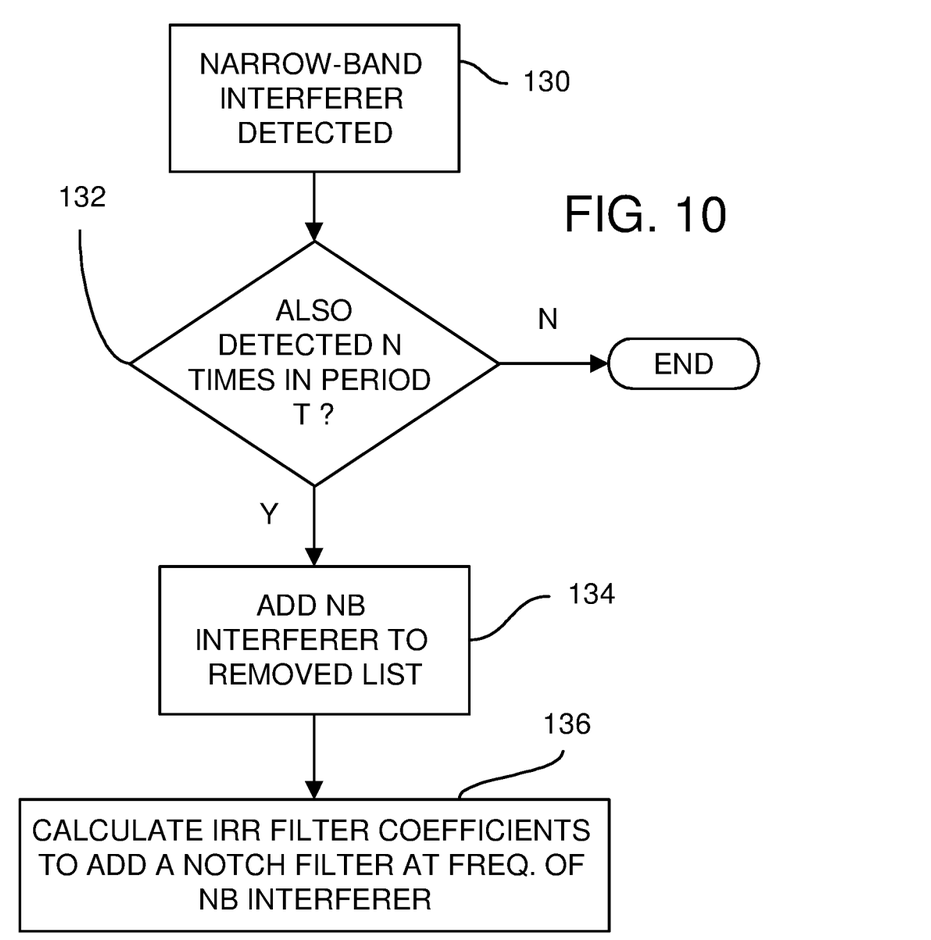
FIG. 10 is a flowchart of the control layer adjusting filter coefficients in response to detection of a narrow band interferer by narrow-band frequency detector.

FIG. 10 is a flowchart of the control layer adjusting filter coefficients in response to detection of a narrow band interferer by narrow-band frequency detector. When narrow-band frequency detector 44 signals that a narrow-band interferer has been detected, step 130, such as by step 112 of FIG. 8, then this control-layer process continues.

When the same narrow-band interferer was also detected at least N times in the last time period T, step 132, then this narrow-band interferer's frequency or sub-carrier can be added to removed list 62, step 134. Control layer 40 re-calculates the coefficients for IR filter 50 to add a new notch filter at the frequency of the narrow-band interferer, step 136.

Initially when narrow-band frequency detector 44 first signals a narrow-band interferer, control layer 40 does not immediately adjust the filter coefficients. This same narrow-band interferer must be detected at least N times in the last time period T, step 132, before the filter is updated. Thus the narrow-band interferer mush remain active for N sensing cycles within the larger time period T before action is taken by control layer 40.

Figure 11:
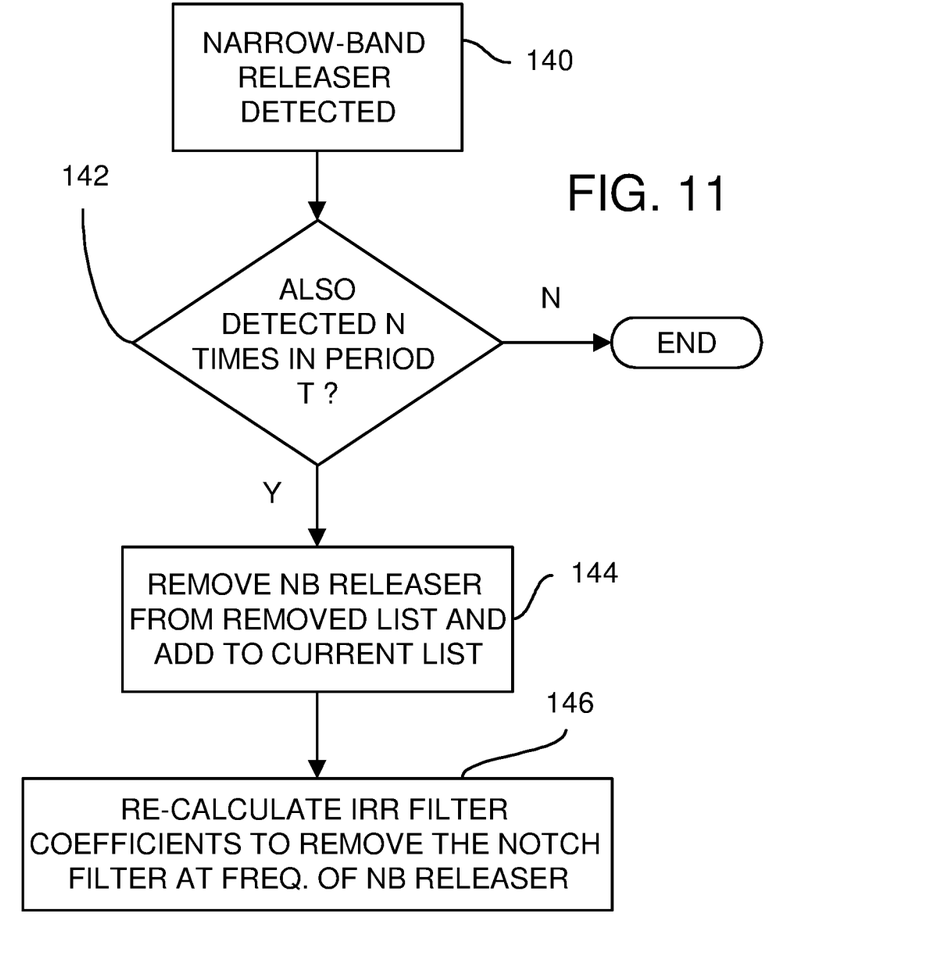
FIG. 11 is a flowchart of the control layer adjusting filter coefficients in response to detection of a narrow band releaser by narrow-band frequency detector.

FIG. 11 is a flowchart of the control layer adjusting filter coefficients in response to detection of a narrow band releaser by narrow-band frequency detector. When narrow-band frequency detector 44 signals that a narrow-band releaser has been detected, step 140, such as by step 122 of FIG. 9, then this control-layer process continues.

When the same narrow-band releaser was also detected at least N times in the last time period T, step 142, then this narrow-band releaser's frequency or sub-carrier can be removed from removed list 62 and added to current list 60, step 144. Control layer 40 re-calculates the coefficients for IIR filter 50 to remove the notch filter at the frequency of the narrow-band releaser, step 146.

When narrow-band frequency detector 44 first signals a narrow-band releaser, control layer 40 does not take action. The same narrow-band releaser must be detected at least N times in the last time period T, step 142, before the filter is updated. Thus the narrow-band releaser mush remain active for N sensing cycles within the larger time period T before action is taken by control layer 40.

Requiring that an interferer or releaser be repeatedly detected N times reduces false triggers. Very brief momentary noise may not trigger an adjustment in IIR filter 50, but longer lasting noise does. Notch filters also remain on longer, even after the noise diminishes, until the N times in period T is met. This delay of updating the filter coefficients adds stability to the receiver and can result in a more robust system.

Alternate Embodiments

Several other embodiments are contemplated by the inventors. For example. For example, removed list 62 and current list 60 may store the frequencies of sub-carriers, or frequencies of noise that might be centered in the intervals between sub-carriers, and may store a numeric frequency value, or a pointer or tag of the frequency value, or a number that points to a particular frequency value. Many storage formats are possible.

For example, current list 60 may store the sub-carrier frequency or frequencies that are currently removed by filter 50. Current list 60 is used to generate the filter coefficients. Two lists may be used to implement removed list 62. A first list L1 stores a number of times that a sub-carrier has been detected as an interferer by narrow-band frequency detector 44. This L1 list also stores a counter of the number of times that sub-carrier has been detected by narrow-band frequency detector 44 within the time period T1. Once the counter reaches N1 times, then that sub-carrier is removed from current list 60 and the filter coefficients updated. A second list L2 stores a number of times that a sub-carrier has been detected as a releaser by narrow-band frequency detector 44. This L2 list also stores a counter of the number of times that sub-carrier has been detected as a releaser by narrow-band frequency detector 44 within the time period T1. Once the counter reaches N1 times, then that sub-carrier is added back into current list 60 and the filter coefficients updated.

There may be many sub-carriers, such as 100 or 1000 or more. Adaptive modulation may be used, and various convolution codes. Encryption may also be used. Many variations of standards such as the HomePlug family of standards may be supported. The signal received over the power line may be transmitted by a HomePlug transmitter or adapter using Orthogonal Frequency-Division Multiplexing (OFDM) to modulate a large number of closely-spaced sub-carrier frequencies, such as up to 1,155 sub-carriers.

Some frequencies may not be used because they cause interference with the allocated radio spectrum. The result from narrow-band frequency detector 44 may be just one sub-carrier frequency among the whole received frequency band, which may be in or out of the transmit frequency band.

Various partitionings of functions and operations are possible. For example, narrow-band frequency detector 44 could also count the number of times an interferer is detected and then signal control layer 40 once N detections are made in time period T. Then control layer 40 could immediately update the filter coefficients. Narrow-band frequency detector 44 could only examine frequencies of sub-carriers 20 and not any intermediate frequencies, or could examine several frequencies between each pair of adjacent sub-carriers 20. Removed list 62 could be limited to sub-carrier frequencies or could have intermediate frequencies. Several adjacent sub-carriers could be combined into a single frequency on removed list 62 and control layer 40 could create a single notch filter that encompasses all of the adjacent sub-carriers. The single frequency could be an intermediate frequency between two adjacent noisy sub-carriers in this example. Rather than processing several sub-carriers with highest power levels, only a single sub-carrier with the highest power level could be detected, tracked, and processed to adjust filter coefficients.

Rather than use two separate processors, time domain processor 52 and frequency-domain processor 54 could share the same DSP hardware or memory but have separate programs to implement time-domain and frequency-domain DSP operations. Some sub-routines could be shared by time domain processor 52 and frequency-domain processor 54. Narrow-band frequency detector 44 could be integrated with frequency-domain processor 54 or could be additional functions performed by frequency-domain processor 54.

The strength of the high-pass filter at and below 60 Hz may also be adjusted by control layer 40 adjusting the coefficients of IIR filter 50 when significant noise is identified below 60 Hz by narrow-band frequency detector 44, or detected by some other means. The high-pass filter cut-off frequency is not restricted to 60 Hz, it may also be the lowest carrier frequency used in transmitter. A low pass filter may be used to remove interference beyond the highest carrier frequency. Other kinds of filtering could be performed by filter 50, such as a FIR filter, although costs may be higher.

While additional power-line sensing and detectors are not needed when using the invention, the invention may be used in conjunction with these other sensors and detectors. For example, the high-pass filter that removes 60 Hz and lower noise may be adjusted using such as sensor or detector, while higher-frequency noise near the transmit frequencies are filtered using notch filters implemented by IIR filter 50. Passive filters may be added to pre-condition the received signal, and various additional signal conditioning and filtering may be performed by time domain processor 52 or by frequency-domain processor 54.

The value of thresholds TH1 and TH2 may be determined empirically or estimated, and may be programmable. The threshold values may be adaptively adjusted using various routines or hardware sensors such as power-line sensors. The thresholds may be flexibly configured depending on variable channel conditions of the power lines. TH1 may be much larger than 1, while TH2 is much smaller than 1. Default values of TH1 and TH2 may be determined by simulation. The values of N and time period T can also be determined or adjusted in a similar way.

The control layer 40 may periodically reset by clearing all sub-carrier frequencies from removed list 62, resetting current list 60 to a default list, and re-calculating coefficients to remove all added notch filters from IIR filter 50. Then narrow-band frequency detector 44 can again detect the K sub-carriers with the largest power and signal control layer 40 to add these to removed list 62, either after N detections in time T, or after some other number of detections. Another alternative is to not have narrow-band frequency detector 44 detect releasers, but instead periodically reset all filters and re-detect. Then the procedures of FIGS. 9 and 11 can be eliminated.

Rather than detect only the highest-power sub-carrier, narrow-band frequency detector 44 can detect several of the highest power sub-carriers. Narrow-band frequency detector 44 may first look for the highest power sub-carrier frequency, then look for the next highest power sub-carrier frequency, etc. until the J highest-power sub-carriers have been detected.

The IIR filter coefficients may be calculated using a default high-pass filter to remove D.C. offset:

$$H_0(z) = \frac{b_{00} + b_{01}z^{-1} + b_{02}z^{-2}}{1 + a_{01}z^{-1} + a_{02}z^{-2}}$$

where $a_n$ are the feedback filter coefficients and $b_n$ are the feed-forward filter coefficients, z is the frequency, and H is filter transfer function.

Suppose removed list 62 is set as vlist=[sc_idx_1, sc_idx_2, sc_idx_k], filter coefficients $a_n$, $b_n$ for each sub-carrier index (sc_idx) in the vlist could then be calculated as follows:

$$H_n(z) = \frac{b_{n0} + b_{n1}z^{-1} + b_{n2}z^{-2}}{1 + a_{n1}z^{-1} + a_{n2}z^{-2}}$$

Finally, convolution of all the filter transfer function Hn(z) (where n ranges from 0 to k) is performed and the narrowband interference removal list (vlist) updated. Whenever the narrowband interference removal list (vlist) is updated, IIR filter coefficients are also updated accordingly.

Convolution may also be done over every several sc_idx in the vlist. For example sc_idx1 convolution with high pass filter is to set IIR filter 1, sc_idx2 and sc_idx3 convolution result is to set IIR filter 2, . . . etc.

In one embodiment, the IIR filter can be extended to a filter bank having one or more cascaded IIR filter(s) and each of them can be enabled and disabled independently.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A noise filtering system comprising:
   an Infinite Impulse Response (IIR) filter receiving an input having a signal carried over a line, the IR filter receiving filter coefficients that cause the IIR filter to implement a high-pass filter and one or more notch filters when generating a filter output;
   a narrow-band frequency detector that locates a max-power frequency of a sub-carrier on the line, the narrow-band frequency detector also generating an average power of all sub-carriers excluding the sub-carrier located near the max-power frequency, the narrow-band frequency detector signaling a detected interferer when a power at the max-power frequency is more than the average power multiplied by a first threshold;
   wherein the first threshold is greater than one;
   a control layer that calculates the filter coefficients and sends the filter coefficients to the IIR filter, the control layer recalculating the filter coefficients to cause the IR filter to implement a notch filter that attenuates power of the sub-carrier near the max-power frequency in response to the narrow-band frequency detector signaling the detected interferer; and
   a counter in the control layer, the counter incrementing for each detected interferer at the max-power frequency signaled by the narrow-band frequency detector, the control layer sending recalculated filter coefficients to the IR filter in response to the counter reaching a target value of N, wherein N is a whole number,
   whereby updating of the IIR filter occurs after N detections by the narrow-band frequency detector, and
   whereby the sub-carrier near the max-power frequency is attenuated by the IR filter in response to updated filter coefficients generated in response to the narrow-band frequency detector signaling the detected interferer.

2. The noise filtering system of claim 1 wherein the narrow-band frequency detector analyzes a frequency-domain signal generated from the filter output.

3. The noise filtering system of claim 2 further comprising:
   a time domain processor that receives the filter output from the IR filter and performs time-domain operations on the filter output;
   a frequency-domain processor coupled to receive an output of the time domain processor, for performing frequency-domain operations.

4. The noise filtering system of claim 3 further comprising:
   a forward-error-correction (FEC) decoder that receives an output from the frequency-domain processor, and performs error correction operations to generate an error-corrected datastream.

5. The noise filtering system of claim 4 further comprising:
   an Analog Front-End (AFE) coupled to the line, for driving the input to the IIR filter.

6. The noise filtering system of claim 1 wherein data is redundantly transmitted over the line using the signal with a plurality of sub-carriers having a plurality of frequencies.

7. The noise filtering system of claim 6 wherein the signal comprises at least 100 sub-carriers having at least 100 different frequencies.

8. The noise filtering system of claim 7 wherein the line is a power line carrying alternating-current (A.C.) of more than 100 volts, wherein the signal carried over the line is a Power-Line Communication (PLC) signal.

9. A noise filtering system comprising:
   an Infinite Impulse Response (IIR) filter receiving an input having a signal carried over a line, the IR filter receiving filter coefficients that cause the IIR filter to implement a high-pass filter and one or more notch filters when generating a filter output;
   a narrow-band frequency detector that locates a max-power frequency of a sub-carrier on the line, the narrow-band frequency detector also generating an average power of all sub-carriers excluding the sub-carrier located near the max-power frequency, the narrow-band frequency detector signaling a detected interferer when a power at the max-power frequency is more than the average power multiplied by a first threshold;
   wherein the first threshold is greater than one; and
   a control layer that calculates the filter coefficients and sends the filter coefficients to the IR filter, the control layer recalculating the filter coefficients to cause the IR filter to implement a notch filter that attenuates power of the sub-carrier near the max-power frequency in response to the narrow-band frequency detector signaling the detected interferer,
   whereby the sub-carrier near the max-power frequency is attenuated by the IR filter in response to updated filter coefficients generated in response to the narrow-band frequency detector signaling the detected interferer;
   wherein the narrow-band frequency detector is able to signal a plurality of max-power frequencies;
   a removed list managed by the control layer, the removed list indicating the max-power frequencies signaled by the narrow-band frequency detector;
   wherein the control layer generates the filter coefficients to cause the IIR filter to implement a plurality of notch filters at the plurality of max-power frequencies indicated by the removed list;
   wherein a plurality of sub-carriers near the plurality of max-power frequencies are attenuated by the IIR filter.

10. The noise filtering system of claim 9 wherein the narrow-band frequency detector determines a current power for each max-power frequency indicated by the removed list;
    wherein the narrow-band frequency detector signals a narrow-band releaser for a max-power frequency when the current power for the max-power frequency is less than an average power of all sub-carriers not on the removed list multiplied by a second threshold;
    wherein the second threshold is less than one; and
    wherein the control layer further recalculates the filter coefficients to cause the IR filter to delete a notch filter that attenuates power of the sub-carrier near the max-power frequency of the narrow-band releaser in response to the narrow-band frequency detector signaling the narrow-band releaser.

11. The noise filtering system of claim 10 further comprising:
    a releaser counter in the control layer, the releaser counter incrementing for each detected narrow-band releaser at the max-power frequency signaled by the narrow-band frequency detector, the control layer sending recalculated filter coefficients to the IR filter in response to the releaser counter reaching a target value of N, wherein N is a whole number,
    whereby updating of the IIR filter occurs after N narrow-band releaser detections by the narrow-band frequency detector.

12. The noise filtering system of claim 9 wherein the IIR filter comprises a plurality of cascaded IR filters, each cascaded IR filter being capable of being enabled and disabled independently.

13. A Power-Line Communication (PLC) receiver comprising:
    a coupler to a power line to isolate a transmitted signal transmitted over a power line that carries at least 100 volts to power appliances, the transmitted signal carried over a plurality of sub-carriers having a plurality of frequencies;
    a filter block that receives the transmitted signal from the coupler, the filter block capable of generating a plurality of filters in response to filter coefficients, the plurality of filters for reducing power-line noise at noisy frequencies;
    an average generator that generates an average power of the plurality of sub-carriers or of a subset of the plurality of sub-carriers;
    a current power detector that generates a current power of a sub-carrier in the plurality of sub-carriers;
    a narrow-band frequency detector that compares the current power to the average power and signals a narrow-band interferer when the current power is greater than the average power by at least a first threshold;
    a removed list of narrow-band interferers;
    a controller that adds a narrow-band interferer to the removed list after the narrow-band frequency detector signals the narrow-band interferer for N times;
    wherein N is a whole number; and
    a filter coefficient calculator that generates the filter coefficients to send to the filter block to implement a plurality of filters that reduce power-line noise at frequencies of the narrow-band interferers in the removed list.

14. The PLC receiver of claim 13 further comprising:
    a time domain processor for performing time-domain operations;
    a frequency-domain processor for performing frequency-domain operations;
    wherein the narrow-band frequency detector receives a frequency-domain signal from the frequency-domain processor,
    wherein the narrow-band frequency detector performs frequency-domain operations to detect the narrow-band interferer.

15. The PLC receiver of claim 14 wherein the filter block generates an output to the time domain processor;
    wherein the time domain processor generates an output to the frequency-domain processor,
    wherein the narrow-band frequency detector analyzes frequency-domain signals after filtering by the filter block.

16. The PLC receiver of claim 13 wherein the filter block is an Infinite Impulse Response (IIR) filter.

17. The PLC receiver of claim 13 wherein the narrow-band frequency detector analyzes power for frequencies of the plurality of sub-carriers and not for intermediate frequencies that are not sub-carrier frequencies;
    wherein the removed list stores indications of frequencies for the plurality of sub-carriers and not intermediate frequencies that are not a frequency having a sub-carrier in the plurality of sub-carriers.

18. The PLC receiver of claim 17 further comprising:
    a removed power detector that generates a removed power of a sub-carrier in the removed list;
    wherein the narrow-band frequency detector also compares the removed power to the average power and signals a narrow-band releaser when the removed power is less than the average power by at least a second threshold;
    wherein the controller removes a narrow-band releaser from the removed list after the narrow-band frequency detector signals the narrow-band releaser for M times; wherein M is a whole number.

19. A method for filtering power-line noise in a Power-Line Communication (PLC) receiver comprising:
    receiving a frequency-domain signal from a frequency-domain processor;
    generating an average power of a plurality of sub-carriers or of a subset of the plurality of sub-carriers;
    finding a high power of a high-power sub-carrier in the plurality of sub-carriers, the high-power sub-carrier having a high-power sub-carrier frequency;
    comparing the high power to the average power and signaling a narrow-band interferer when the high power is more than a first threshold greater than the average power;
    adding the high-power sub-carrier frequency to a removed list when the narrow-band interferer is signaled for at least N times in a time period;
    wherein N is a whole number;
    generating filter coefficients having notch filters at the high-power sub-carrier frequencies in the removed list;
    using an Infinite Impulse Response (IIR) filter that receives the filter coefficients generated using the removed list to filter a signal received from a power line, wherein the notch filters reduce noise at the high-power sub-carrier frequencies in the removed list.

\* \* \* \* \*